United States Patent [19]

Oono et al.

[11] Patent Number: 4,701,674

[45] Date of Patent: Oct. 20, 1987

[54] OPTICAL BEAM MODULATION AND DEFLECTION DEVICE

[75] Inventors: Hiroshi Oono; Shigenori Oosaka, both of Asaka, Japan

[73] Assignee: Fuji Photo Film Co., Ltd., Kanagawa, Japan

[21] Appl. No.: 29,356

[22] Filed: Mar. 23, 1987

Related U.S. Application Data

[63] Continuation of Ser. No. 213,595, Dec. 5, 1980, abandoned.

[30] Foreign Application Priority Data

Dec. 10, 1979 [JP] Japan .................................. 54-160046

[51] Int. Cl.4 .......................... H01J 7/44; G06K 7/10
[52] U.S. Cl. ..................................... 315/276; 235/454; 235/462; 250/568; 315/57; 369/119
[58] Field of Search ................. 315/276, 57; 250/568; 369/18, 119, 122; 235/454, 462

[56] References Cited

U.S. PATENT DOCUMENTS

| | | | |
|---|---|---|---|
| 834,496 | 10/1906 | Seeley | 315/271 |
| 2,242,812 | 5/1941 | Brown | 315/357 |
| 2,270,517 | 1/1942 | Drucker | 353/102 |
| 2,935,316 | 5/1960 | Bradstreet | 362/35 |
| 3,316,447 | 4/1967 | Hochstein | 315/276 |
| 3,739,088 | 6/1973 | Landsman | 346/76 L |
| 3,850,515 | 11/1974 | Burch | 353/102 |
| 3,909,670 | 10/1975 | Wakamatsu | 315/276 |
| 4,005,330 | 1/1977 | Glascock | 315/276 |
| 4,055,058 | 10/1977 | Tewsley | 250/551 |
| 4,236,086 | 11/1980 | Hoebel | 250/551 |
| 4,337,412 | 6/1982 | Kawamura | 315/57 |
| 4,360,908 | 11/1982 | Howe et al. | 346/76 L |
| 4,546,463 | 10/1985 | Opheij et al. | 369/122 |

*Primary Examiner*—Harold Dixon

[57] ABSTRACT

An optical beam modulation and deflection device having a semiconductor laser mounted on a rotator which employs a rotating transformer so as to supply electrical power to the rotator in a contactless manner.

10 Claims, 7 Drawing Figures

OPTICAL BEAM MODULATION AND DEFLECTION DEVICE

This application is a continuation, of application Ser. No. 213,595, filed Dec. 5, 1980 now abandoned.

BACKGROUND OF THE INVENTION

1. Field of the Invention

This invention relates to an optical beam modulation and deflection device used for causing a laser beam or other optical beam to scan the surface of an information recording medium for the purpose of writing in or reading out information, and more particularly to an optical beam modulation deflection device of the type wherein a light source (a semiconductor laser, light-emitting diode etc.) is mounted on a rotator and the rotating light beam from the light source is simultaneously modulated and deflected in the same device, characterized in that the optical beam is modulated by the driving current for the light source at the same time that it is deflected by the rotation of the rotator.

2. Description of the Prior Art

Laser light sources have the advantage that they are capable of generating optical beams which enjoy a degree of excellence in their spatial interference properties and spectral line brightness which is difficult to obtain with other kinds of light sources. Because of these advantages, laser light sources are presently finding numerous applications in optical reading and recording devices. Among optical reading devices to which laser light sources are applied, there are facsimile transmitters, automatic bar code readers (for reading bar-coded labels), film scratch detection devices etc. In the area of optical recording devices using laser light sources, there can be mentioned data recording devices for video disks, facsimile receivers etc. In the past, these laser using devices mainly employed such so-called gas lasers as He-Ne lasers, He-Cd lasers, Ar lasers and the like. In the case of gas lasers, however, not only is the light source itself large but it must be used together with a scanner and a deflector if it is to be employed in an optical beam scanning application. As a result, devices using gas lasers have tended to be large and costly. Recently, therefore, utilization of small, high-efficiency semiconductor lasers has been increasing rapidly. For example, Japanese Public Disclosure No. 125044/78 (published Nov. 1, 1978) discloses a device for forming straight scanning lines by rotating a semiconductor laser.

The semiconductor laser scanning device described in Public Disclosure No. 125044/78 has numerous advantages; it is compact, low in cost and is capable of both modulating and deflecting the optical beam without need of additional devices. The device does, however, suffer from certain defects which result from the fact that electric power for the rotating light source is supplied to the light source via brushes or from a generator. When brushes are used, there are the drawbacks that the semiconductor laser, which is easily damaged by electrical shock, may breakdown under the electrical noise generated by the brushes and that utilization over long periods is impossible because of wearing of the brushes. On the other hand, when a generator is used, there are the drawbacks that the large size of the generator required makes it necessary to use a high power motor for rotation of the semiconductor laser and that it is impossible to electrically adjust the various parts of the device with the motor stopped.

SUMMARY OF THE INVENTION

In light of the disadvantages and problems of the prior art mentioned above, it is the object of the present invention to provide an optical beam modulation and deflection device which is free from the drawbacks of conventional laser devices.

A more specific object of the present invention is to provide an optical beam modulation and deflection device constructed so that electric power is supplied to the rotator on which the light source is mounted in a contactless manner.

The optical beam modulation and deflection device according to the present invention is characterized in that electric power is supplied by using a rotating transformer (to be described later) which is capable of serving as a transformer even when rotated, the primary side of the rotating transformer being mounted on the fixed base side and the secondary side of the transformer being mounted on the side of the rotator bearing the light source.

As the optical beam modulation and deflection device according to the present invention has no contacts for the supply of electric power, there is no generation of electrical shocks. As, moreover, the parts of the device which are mounted on the rotator are light, the rotator can be driven with a low power motor.

DESCRIPTION OF THE PREFERRED EMBODIMENT

Figure 1:
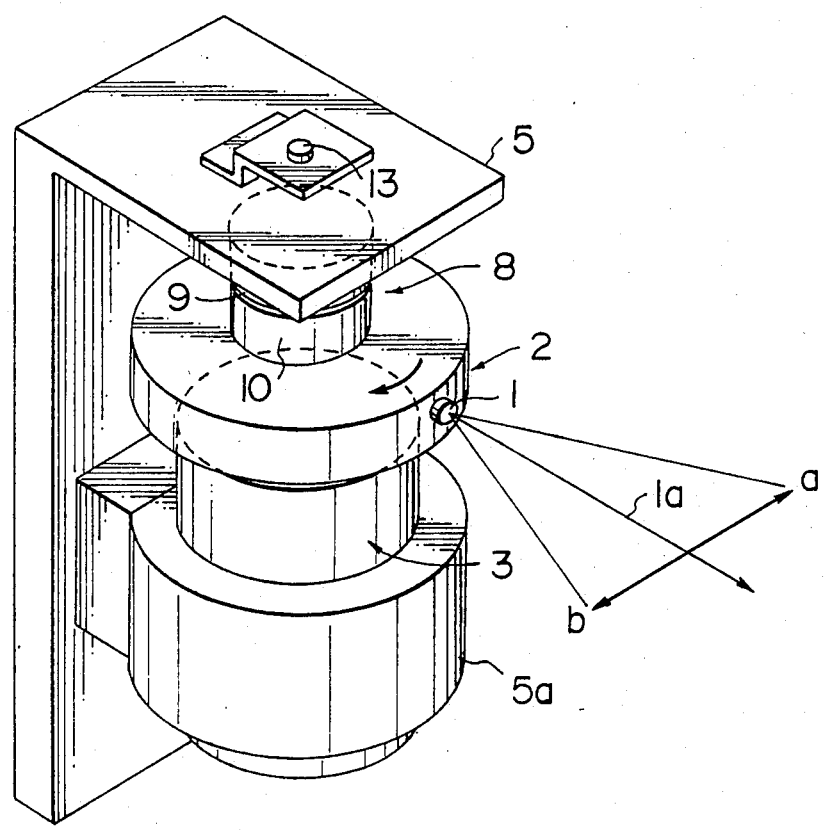
FIG. 1 is a perspective view of the optical beam modulation and deflection device in accordance with an embodiment of the present invention.
Figure 2:
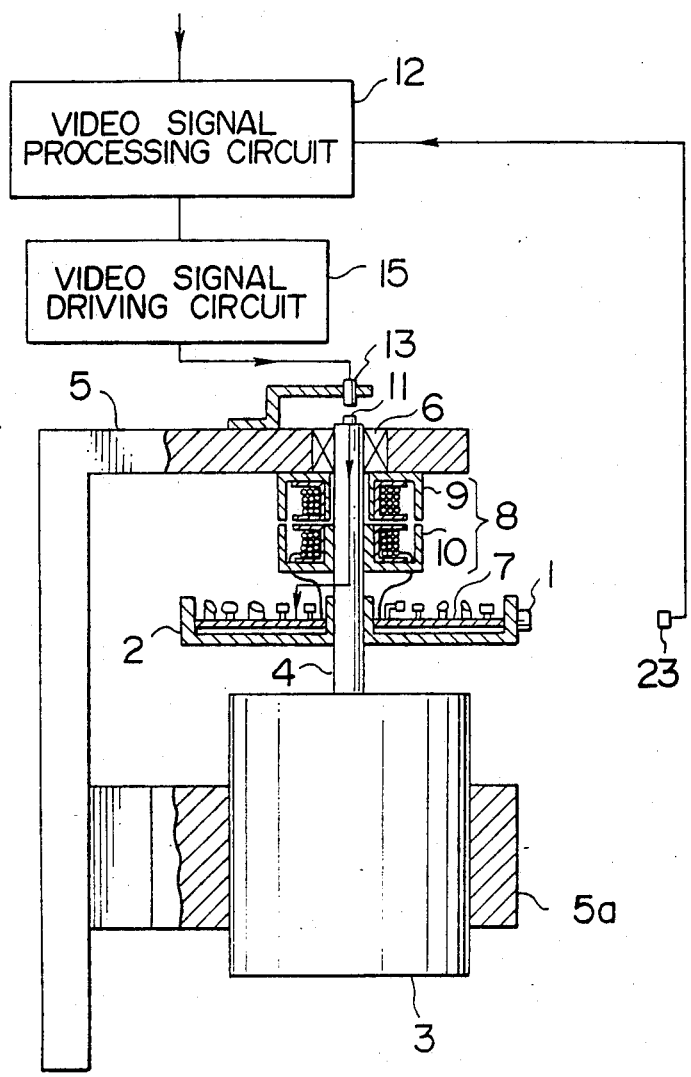
FIG. 2 is a cross-sectional view of the optical beam modulation and deflection device as shown in FIG. 1.

Reference is now made to FIGS. 1 and 2 which are respectively a perspective view and a side view, partially in cross-section, of the optical beam modulation and deflection device in accordance with an embodiment of the present invention. As will be noted from these figures, the device has a rotator 2 on which is mounted a semiconductor laser light source 1. The rotator 2 is fixed to the shaft 4 of a high-speed motor 3 which is fixed on the stationary mount 5a and rotates together with the motor. This rotation of the rotator 2 causes the laser beam 1a issuing from the semiconductor laser light source 1 to describe a scanning motion in the a - b direction. One end of the shaft 4 is rotatably retained in a bearing 6 provided in a fixed base 5. The rotator 2 is a hollow body, for example, and has incorporated therein a printed circuit board 7 for driving and controlling the semiconductor laser. The printed circuit board 7 comprises a rectifying and smoothing circuit, modulation and driving circuits, a temperature control circuit, etc.

Figure 3:
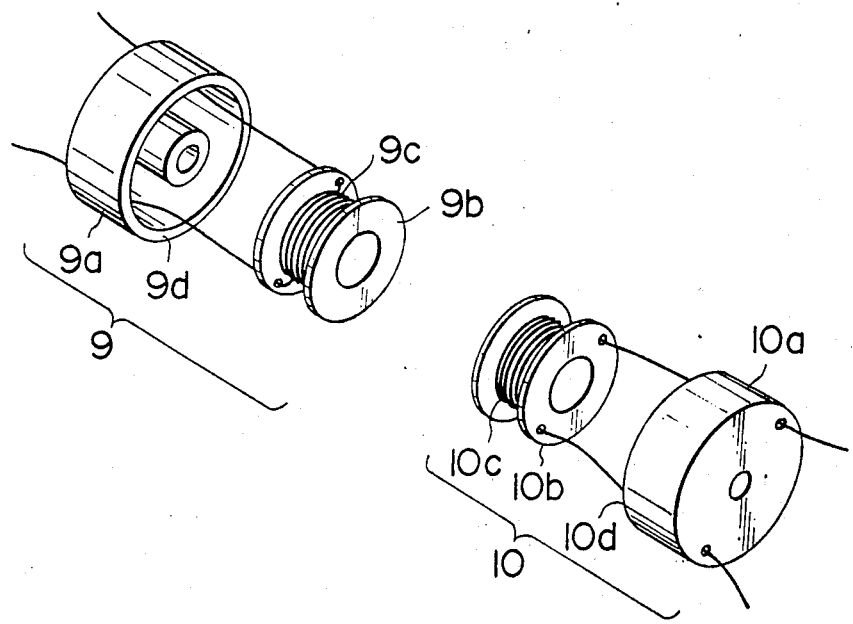
FIG. 3 is an exploded perspective view of the rotating transformer employed in the device as shown in FIGS. 1 and 2.

Between the rotator 2 and the base 5 is provided a rotating transformer 8. As shown in the exploded perspective view in FIG. 3, the transformer 8 consists of a fixed primary side section 9 and a rotating secondary side section 10. The primary and secondary side sections have ferrite pot cores 9a and 10a, respectively, and are constituted of bobbins 9b, 10b housed in the pot cores 9a, 10a and coils 9c, 10c wound on these bobbins. The primary side section 9 of the rotating transformer 8 is fixed to the base 5 and the secondary side section is fixed to the shaft 4 and the rotator 2 so as to rotate together therewith. The primary and secondary side sections are separated slightly in order to prevent them from rotating together.

A light detector 11 consisting of a photoreceptor is provided at the tip of the shaft 4. This light detector 11 receives light from a light emitting means 13 controlled to flash in accordance with a signal received from a video signal processing circuit 12 and produces an electrical signal corresponding to the light it receives. This electrical signal is fed to the driving circuit in the printed circuit board 7 for driving and controlling the semiconductor laser. As a result, the semiconductor laser light source 1 is driven and controlled to emit a modulated laser beam.

Figure 4:
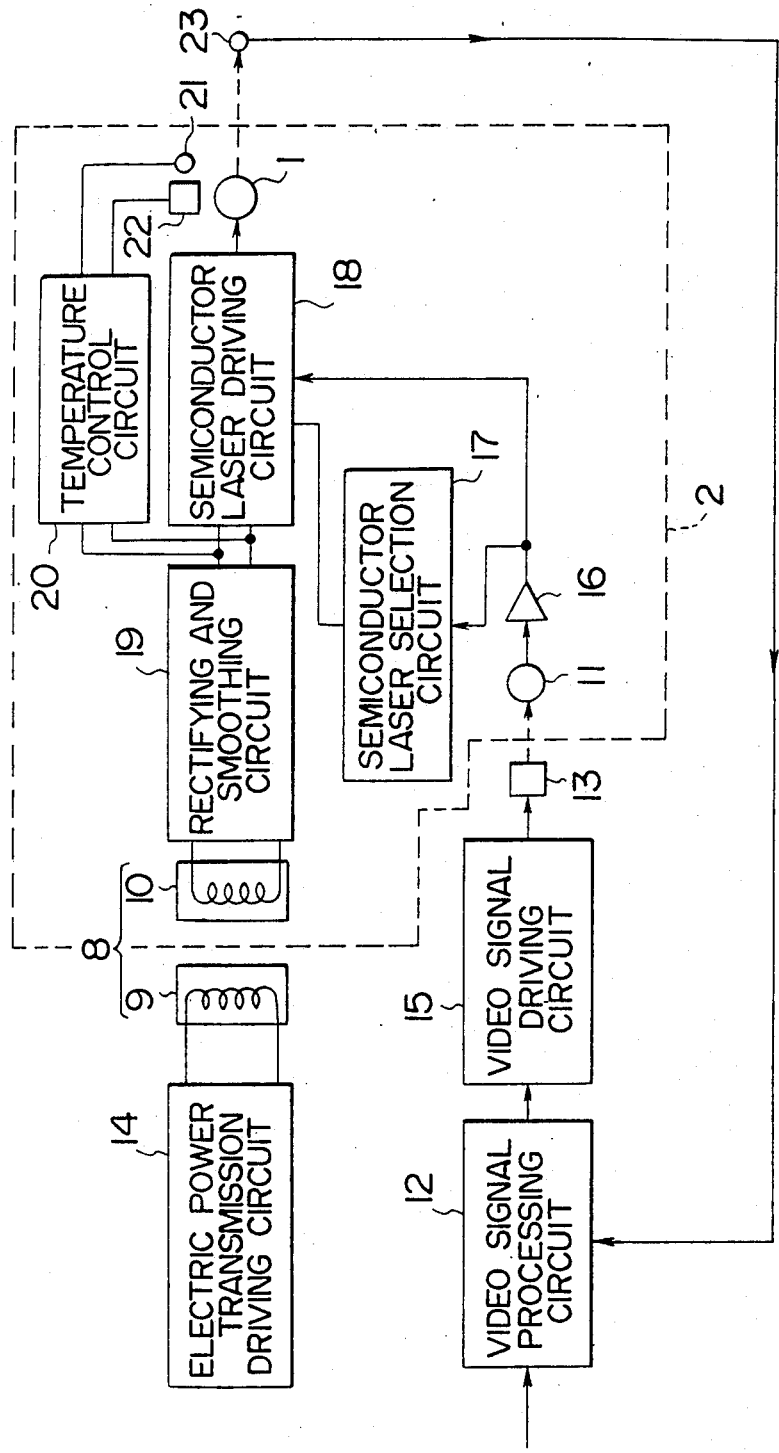
FIG. 4 is a block diagram showing the electrical system of the device in accordance with an embodiment of the present invention.

In FIG. 4 is shown a diagrammatic explanation of the electrical system of the optical beam modulation and deflection device of the present invention shown in FIGS. 1 and 2.

An explanation will first be given regarding the transmission of electric power.

An electric power transmission driving circuit 14 drives the primary side of the rotating transformer with, in this particular embodiment, a 20 KHz square wave produced by a switching transistor. At this time, there is produced in the secondary side 10 of the rotating transformer 8 a voltage waveform proportional to the turn ratio between the primary and secondary sides. This voltage waveform is fed to a rectifying and smoothing circuit 19 where it enters a bridge rectifier circuit to be full-wave rectified. After being subjected to this full-wave rectification, the square wave is passed to a voltage regulator of the generally known type and is outputted as a smoothed DC voltage. In the present embodiment, the power obtained was 10 W, and adequate performance was obtained with a DC voltage ripple of between 0.1 and 0.2%. The DC voltage produced in this way was used as the power for a semiconductor laser driving circuit 18 and a temperature control circuit 20.

Next an explanation will be made regarding the transmission of video signals.

Figure 5:
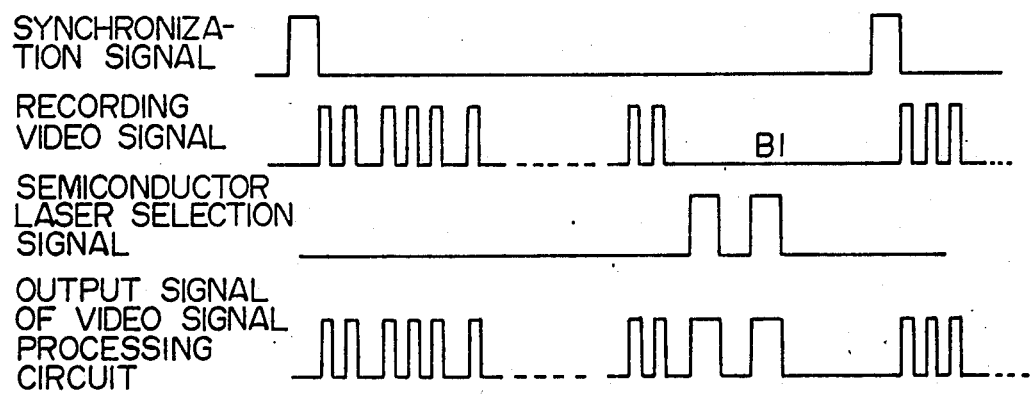
FIG. 5 is a view showing wave forms for explaining the video signal processing circuit of the device in accordance with an embodiment of the present invention.

When the device according to the present invention is used in recording, there are fed to a video signal processing circuit 12 not only the video signals to be recorded but also such other signals as a synchronizing signal obtained from a light detector 23 (a signal obtained from a light sensor placed at the scanning start position in the conventional manner). Then this video signal processing circuit 12 uses the video signal to be recorded to produce an AM, FM, RCM or other type modulated signal which is sent to a video signal driving circuit 15. Also, in cases where a plurality of semiconductor lasers 1 are mounted on the rotator 2, the video signal processing circuit 12 carries out the processing for transmitting, during the blanking period, a signal for selecting the semiconductor laser to be used. FIG. 5 shows the waveform for these signals over a period corresponding to a single scan of the optical beam.

The video signal driving circuit 15 drives the light emitting means 13 (a semiconductor laser, light emitting diode etc.) and in this way a signal is transmitted to the rotator 2 in a contactless manner. At this time of course the rotating transformer is made use of. The light detector 11 comprised of a photoreceptor and fixed on the tip of the shaft 4 thus receives the bottommost signal shown in FIG. 5, converts it to an electric signal and sends the converted signal to an amplifier 16. The signal is amplified by the amplifier 16 and is sent, on the one hand, to a semiconductor laser selection circuit 17 which sends a selection signal to the semiconductor laser driving circuit 18, and, on the other hand, directly to the semiconductor laser driving circuit 18, thus turning on one of the semiconductor lasers in accordance with the selection signal so as to obtain a modulated optical signal.

When the device according to the present invention is used in an optical reader, as far as modulation is concerned, it is only necessary to maintain the light output constant in the course of scanning, and, therefore, no explanation will be made in this respect.

Temperature control is performed in a conventional manner by detecting the temperature with a thermistor 21 and using an electronic cooling element 22 for cooling.

Next a detailed explanation will be given of the rotating transformer. Needless to say, the structure of the rotating transformer is not limited to that shown in FIG. 3. All that is required is that the state of magnetic interconnection between the surfaces of magnetic interconnection 9d, 10d between the primary and secondary sides not be changed by the rotation of 10d. So long as this condition is met, electric power can be transmitted even during rotation. Moreover, the use of ferrite pot cores for the rotating transformer enhances the effectiveness of electric power transmission. In the present embodiment, the transmission of electric power is carried out using a square wave with a high frequency of 20 KHz and this makes it possible to use small ferrite pot coils. Thus the device can be made compact.

It should be noted that if the signal to be recorded is fed directly through the rotating transformer 8 as an electric power signal by the electric power transmission driving circuit 14, there is no need for the light emitting means 13 or the semiconductor laser light source.

Now two embodiments of a light beam scanning device employing the optical beam modulation and deflection device in accordance with the present invention will be described with reference to FIGS. 6 and 7.

Figure 6:
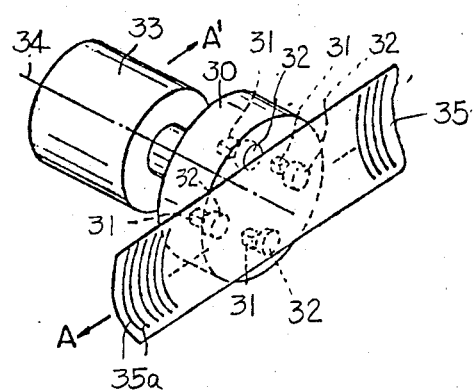
FIG. 6 is a perspective view of a preferred embodiment of a light beam scanning device employing the optical beam modulation and deflection device in accordance with the present invention.

In FIG. 6, semiconductor laser light sources 31 are mounted on a rotator 30 together with condenser optical systems 32 fixed just in front of the light sources 31 so that the light sources 31 emit laser beams in parallel to the axis of rotation 34 of the rotator 30. The rotator 30 is rotated by a motor 33 about the axis of rotation 34. In front of the rotator 30, there is provided a recording or read-out medium 35. As the rotator 30 rotates with the medium 35 moved in the direction of arrow A or with the rotator 30 and the motor 33 moved in the direction of arrow A', the semiconductor laser light sources 31 scan the medium 35 as shown by the scanning lines 35a. The scanning lines 35a in this embodiment are parallel arcuate lines.

Figure 7:
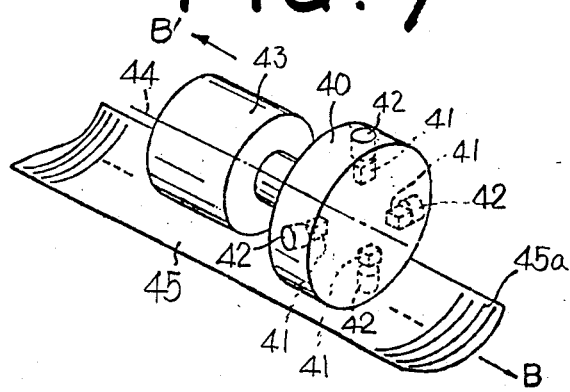
FIG. 7 is a perspective view of another embodiment of a light beam scanning device employing the optical beam modulation and deflection device in accordance with the present invention.

In the embodiment shown in FIG. 7, four semiconductor laser light sources 41 are mounted on a rotator 40 together with condenser optical systems 32 fixed in front of the light sources 41 so that the light sources 41 emit laser beams in the direction perpendicular to the axis of rotation 44 of the rotator 40 rotated by the motor 43. In this embodiment, a recording or read out medium 45 is provided adjacent to the periphery 40a of the rotator 40 and extends in a cylindrical form along the axis of rotation 44. As the rotator 40 rotates with the medium 45 moved in the direction of arrow B or with the rotator 40 moved in the direction of arrow B', the semiconductor laser light sources 41 scan the medium 45 as shown by the scanning lines 45a. The scanning lines 45a in this embodiment are parallel lines.

In the above embodiments, the condenser optical systems 32, 42 may be comprised of light beam wave shaping means like cylindrical lenses or optical fibers and light beam converging means like microscopic lenses particularly when it is necessary to correct difference in diverging angles between the angle of divergence in the direction of junction face of the semiconductor laser light sources and the angle of divergence in the direction perpendicular thereto. Further, the size and the weight of the optical systems 32, 42 can be made small by replacing the microscopic lenses with gradient optics or hologram lenses. Particularly, the hologram lens is advantageous in that it serves not only as the beam wave shaping means but also the beam converging means. The number of the light sources 31, 41 may be less or more than four as shown in the above embodiments. When recording information on the medium 35, 45, the laser beam is modulated by use of an electric signal by controlling the driving power of the semiconductor laser light sources. When reading out information carried by the medium 35, 45, the laser beam passing through the medium 35, 45 is detected by means of photodetectors. In case that the medium 35, 45 is of reflection type, it is possible to utilize a self-coupling effect of the semiconductor laser light sources that when the light sources receive light emitted thereby the terminal potential thereof changes according to the amount of light received. By this effect, the amount of change in the terminal potential can be taken out in the form of electric signal.

In the above two embodiments shown in FIGS. 6 and 7, the semiconductor laser light sources 31, 41 are mounted at the fixed positions with respect to the condenser optical system and are rotated by the rotator 30, 40 in a fixed path, there are various advantages as follows. First, the shape of the scanning light beam does not change. Second, the structure of the condenser optical systems 32, 42 can be made simple, since they only have to condense the light beam advancing in a fixed optical path and not in a sweeping or swinging optical path. Third, even if the laser beam has a wide angle of divergence and is not easy to converge, it is possible to make a converging light beam easily by use of an optical system having a small diameter because the optical system can be located close to the light source. Fourth, the optical control of the laser beam is easy since the shape of the converged laser beam does not change on the scanning line, and accordingly the control can be completed by adjusting the shape of the laser beam at one point on one scanning line. Fifth, the air resistance can be made very small and the rotation at a high speed can be made highly stable by burying the laser sources 31, 41 and the optical systems 32, 42 in the rotator 30, 40.

As is clear from the above description, in the optical beam modulation and deflection device in accordance with the present invention, a rotating transformer is used to transmit driving electric power and an electric power modulation signal in a contactless manner. Thus, in comparison with a device that utilizes an electric supply mechanism employing brushes, the device of the present invention has a longer service life and keeps the semiconductor laser free from damage by electric shock. On the other hand, in comparison with a device that utilizes an electric supply mechanism employing a generator, it is advantageous in that it can be made more compact, that it requires only a low power motor, and that electrical adjustment of its component parts can be carried out even when the rotator is stopped.

We claim:

1. An optical beam modulation and deflection device comprising a rotator rotatably supported on a base to rotate about a rotational axis, a light source mounted on said rotator to be directed outwardly of said rotator, and a condenser optical system mounted on said rotator to rotate therewith, said condenser optical system being mounted on the rotator in a manner such that the orientation of said condenser optical system relative to said light source remains fixed during rotation, said condenser optical system focusing the light emitted from the source outwardly of said rotator, a rotating transformer the primary side of which is fixed on said base and the secondary side of which is fixed on said rotator for supplying electric power for driving said light source in a contactless manner through said rotating transformer, and a light beam scanning device for recording or reading out an image by scanning a medium placed near said rotator with a light beam from said light source.

2. An optical beam modulation and deflection device according to claim 1, wherein the rotating transformer includes ferrite pot cores.

3. An optical beam modulation and deflection device according to claim 1, wherein a high-frequency electric power signal is applied to the rotating transformer.

4. The optical beam modulation and deflection device according to claim 1 wherein said light source and said condenser optical system are oriented on said rotator to direct light emitted from said light source along said rotational axis.

5. The optical beam modulation and deflection device according to claim 1 wherein said light source and said condenser optical system are oriented on said rotator to direct light emitted from said light source away from said rotational axis.

6. The optical beam modulation and deflection device according to claim 1 wherein said light source and said condenser optical system are oriented on said rotator to direct light emitted from said light source along parallel lines.

7. The optical beam modulation and deflection device according to claim 1 wherein said condenser optical system includes cylindrical lenses.

8. The optical beam modulation and deflection device according to claim 1 further including a movable recording medium located adjacent to said rotator to receive light from said condenser lens system and means for moving said recording medium transverely of the direction of light emitted from said light source.

9. The optical beam modulation and deflection device according to claim 1 further including a plurality of light sources mounted on said rotator and a plurality of condenser optical systems mounted on said rotator, each condenser optical system being associated with one of said light sources.

10. An optical beam modulation and deflection device according to claim 2, wherein a high-frequency electric power signal is applied to the rotating transformer.

* * * * *